March 14, 1967   G. A. JOHNSON ETAL   3,309,116
SPLIT SLEEVE ASSEMBLY
Filed Sept. 10, 1964
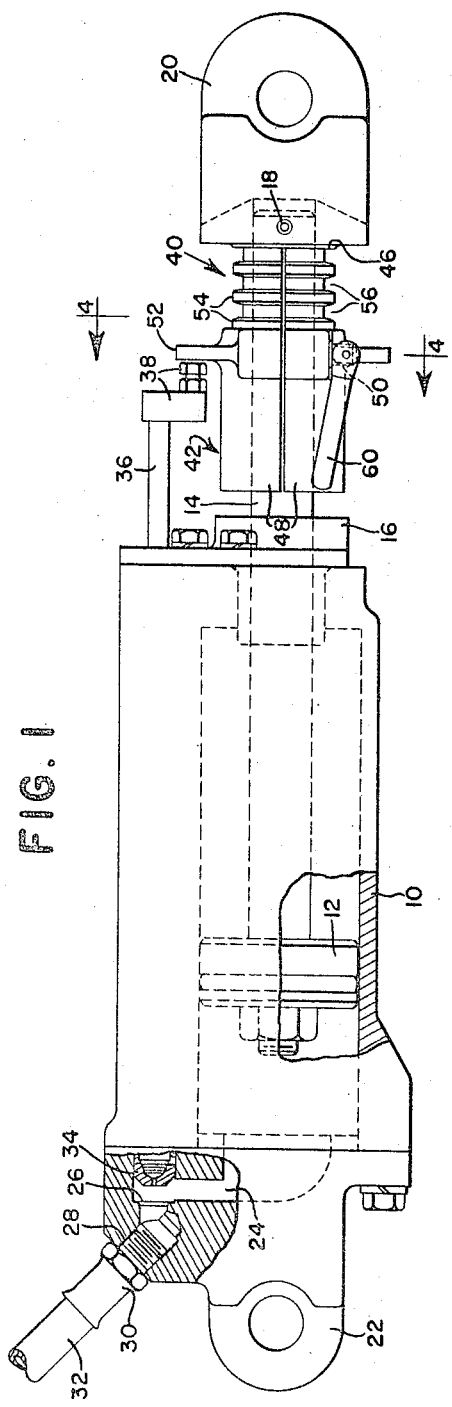
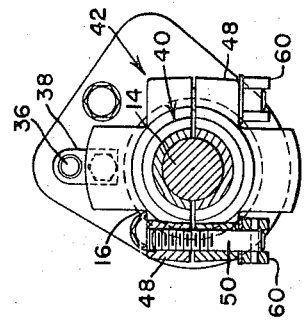
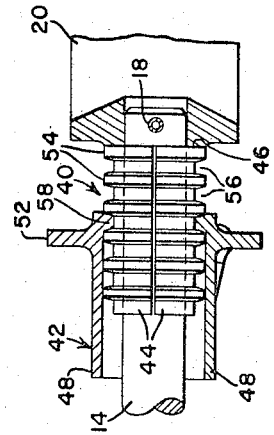
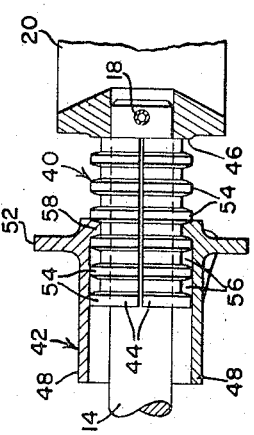
INVENTORS
G. A. JOHNSON
A. G. WASCHEK United States Patent Office 3,309,116
Patented Mar. 14, 1967

3,309,116
SPLIT SLEEVE ASSEMBLY
Glen A. Johnson, Waterloo, and Arvid G. Waschek, Cedar Falls, Iowa, assignors to Deere & Company, Moline, Ill., a corporation of Delaware
Filed Sept. 10, 1964, Ser. No. 395,514
1 Claim. (Cl. 287—52.04)

This invention relates to a split sleeve assembly as employed for the purpose of creating an adjustable stop to limit the extent of movement of a movable member.

The invention finds particular, but not exclusive, utility as an adjustable stop on the exposed portion of a piston rod of a fluid-pressure cylinder and piston unit of the type used in adjusting tractor-associated agricultural implements. A good example of this environment is disclosed in the U.S. patent to McCormick, 2,442,306. A brief explanation of the situation is that the fluid-pressure cylinder is exhausted, for example, to allow the piston rod to retract in the lowering of an implement. To assure that the implement will always be lowered to the same extent, a stop is provided, and this stop is made adjustable so that variations in the extent of lowering may be achieved. The McCormick patent shows a construction in which the stop is adjustable by means of the selective positioning of one or more pins in a rod-carried yoke. In another example, such as in the U.S. patent to Fletcher, 2,615,430, the adjustable stop is utilized to operate a control valve which cuts off the discharge of exhausting fluid, achieving generally the same result; that is, when the fluid exhaust is cut off, the piston will stop at a predetermined point.

The principal object of the present invention is to provide a novel and simplified stop arrangement that may be utilized in the environments of either McCormick or Fletcher; that is to say, the stop may be used as a positive stop, abutting between the piston rod clevis or yoke and the proximate end of the cylinder, or it may be employed on the piston rod to actuate a valve as in the Fletcher patent. It is a further object of the invention to construct the assembly of a pair of split sleeve structures, comprising an inner sleeve structure which embraces the piston rod and an outer sleeve structure which embraces the inner structure, the outer structure being also split and held together by clamping means which secures it to the inner structure and in turn mounts the inner structure on the piston rod. A still further object resides in means interengageable between the two structures for selectively positioning one of the structures axially relative to the other whereby to effect adjustments in the point at which the stop becomes effective. A still further object resides in the means whereby one of the structures may be reversed end-for-end so as to increase the number of adjustment increments.

The foregoing and other important objects and desirable features inherent in and encompassed by the invention will become apparent as a preferred embodiment is disclosed, by way of example, in the accompanying description and single sheet of drawings, the figures of which are described below.

FIG. 1 is an illustration of a typical cylinder-piston assembly, with portions broken away and shown in section, to which the adjustable stop structure is applied.

FIG. 2 is a fragmentary sectional view showing the relationship of the two structures of the stop in one position.

FIG. 3 is a similar view but shows the inner structure reversed end-for-end to vary the adjustment increments.

FIG. 4 is a view, partly in section, as seen generally along the line 4—4 on FIG. 1.

As previously indicated, the particular utility of the invention in connection with the environment disclosed does not limit the fields in which it may be exploited. Consequently, the disclosure should be taken as illustrative and not limiting.

The basic structure chosen for purposes of illustration comprises a cylinder-piston unit of the fluid-pressure-chargeable and -dischargeable type comprising a cylinder 10 and piston 12, the latter having a piston rod 14 projecting axially beyond one end 16 of the cylinder. Secured to the terminal or free end of the piston rod, as by a cross pin 18, is a clevis or yoke 20, typically attachable to an implement or other part to be moved or adjusted. The opposite end of the cylinder is fitted with a yoke or clevis 22 which is normally attached to some fixed part of the implement. The end of the cylinder at which the yoke or clevis 22 is provided is formed with an internal cavity 24 which has a valve-seat junction 26 with a threaded bore 28 into which is screwed a fitting 30 of a fluid pressure line 32. These details may be exactly like those in the Fletcher patent or may be varied to suit individual desires.

A cylinder-piston unit of this type is normally of a single-acting or one-way nature; that is to say, fluid supplied under pressure through the line 32 fills the cavity 24 to cause the piston and piston rod to extend, to the right as seen in the drawing. Fluid exhausted through the line 32 empties the cavity, of course, and the piston and piston rod retract. In a typical situation, with the clevis 22 anchored to the implement frame, for example, and the clevis 20 connected to a movable implement part, descent of the part by gravity will cause the unit 10–12 to retract. Without more, the extent of retraction depends upon the time at which the operator closes the control valve (not shown). According to the McCormick patent, the extent of retraction may be predetermined, irrespective of operation of the valve, by interposing some form of stop between the yoke 20 and the cylinder end 16. According to the Fletcher patent, a cylinder-carried valve may be closed by the predetermined setting of a stop or control member. A corresponding cylinder-carried valve arrangement is shown here, comprising a valve member 34 cooperative with the valve seat 26 and actuated by a rod 36 which extends externally at the end of the cylinder 16 in parallelism with the exposed portion of the piston rod 14. The rod 36 carries at one end thereof an abutment 38. As explained in the Fletcher patent, if some form of stop mounted on the piston rod engages the valve control rod at the abutment or stop corresponding to that shown at 38 here, further movement of the piston rod in a retracting direction will close the valve (such as 26–34 here), stopping escape of fluid from the cylinder so that a body of fluid is trapped at the left-hand end of the cylinder and thereby limiting further retraction of the piston and piston rod.

As already outlined, the present invention provides an improvement which may be used in the environments of known structures, such as exemplified by the McCormick and Fletcher patents.

Fundamentally, the improvement resides in inner and outer sleeve structures designated respectively in general by the numerals 40 and 42. The structure 40 comprises a pair of complementary, radially separable parts or halves 44, each of arcuate cross-section, here slightly less than semi-cylindrical. These will be seen to embrace the piston rod 14 in the area thereof closely proximate to the piston rod clevis 20 so that the cylinder-facing end of the clevis, as at 46, is abutted by one end of the structure 40. The length of this structure is somewhat less than the total exposed portion of the piston rod when fully extended; although, length is a matter of choice, depending upon the circumstances and the range of extension and retraction of the cylinder-piston unit.

The other structure 42 is also in the form of a split sleeve having complementary, radially separable halves 48 of arcuate cross-section, here again slightly less than semi-circular. The general arrangement is such that when the two halves 48 of the outer split sleeve structure 42 are assembled in concentric embracing relationship to the two halves 44 of the inner split-sleeve structure 40, the former secures the latter together with the latter in rod-embracing relationship as respects the piston rod 14. In short, the same means that secures the halves 48 together also secures the halves 44 together and in position on the rod 14. In the present case, the means for accomplishing the securing function comprises a pair of threaded draw members or bolts 50, passed loosely through appropriate apertures in the lower half 48 and into respectively alined tapped bores in the upper half 48.

When the two sleeve structures are assembled and installed on the rod 14 between the clevis end 46 and the cylinder end 16, the point at which the piston rod will be stopped against further retraction is determined by the axial relationship of the sleeve structures, in the sense that the left-hand end of the structure 42 becomes a stop or abutment engageable directly with the cylinder end 16 (McCormick situation) or a flange 52 on the structure 42 engages the stop or abutment means 38 on the right-hand end of the valve operating rod 36 (Fletcher situation).

Ignoring for the moment the relationship between the flange 52 and the valve rod 36, it will be seen that when the left-hand end of the structure 42 engages the cylinder end 16, the opposite end of the structure 40 being in engagement with the end 46 of the clevis 20, the piston rod is positively stopped against further retraction. It is a feature of the assembly that the relative axial positions of the structures 40 and 42 may be adjusted, varying the over-all length of the assembly 40–42 and thus varying the point at which the stop becomes effective. For this purpose, interengageable means is provided between the exterior of the structure 40 and the interior of the structure 42. In the present case, this means includes a plurality of uniformly axially spaced abutments on the inner structure sleeves 44. It is preferred that on each half 44 each abutment takes the form of an arcuate rib 54. This of course provides a series of intervening or alternating grooves 56. The interengageable abutment means on the interior of the structure 42 comprises an arcuate (here substantially semi-circular) internal rib 58 which is capable of selectively interfitting with the grooves 56 between the inner sleeve structure ribs 54.

The pre-selection of interengagement between the rib 58 and a groove 56 is accomplished by separating the outer sleeve structure halves by means of loosening the draw bolts 50, which is facilitated by providing each bolt with a pivoted handle 60. With the sleeve halves 48 separated sufficiently to clear the rib 58 from the grooves 56, the structure 42 may be adjusted axially, thus varying the axial offset between its left-hand end, for example, and the left-hand end of the structure 40. The operator will of course hold the two halves 44 in place while axially positioning the halves 48, and, once having selected the axial position, he will tighten the clamp or draw bolts so as to complete the assembly.

In a preferred embodiment, the ribs 54 on the sleeve structure 40 may be spaced apart at intervals of, say, one-half inch. This means, therefore, that the outer sleeve structure 42 may be axially adjusted according to these increments. It is a further feature of the invention, however, that the ribs 54 are asymmetrically arranged relative to axially opposite ends of the inner sleeve structure 40; that is to say, and looking at FIG. 2, the first or left-hand rib is at the extreme end of the structure and the right-hand endmost rib is offset from the right-hand end of the structure by the width of a groove. When the assembly is taken apart so that the sleeve structure 40 can be separated and reversed end-for-end, the first mentioned rib now occurs at the right-hand end (FIG. 3) and the endmost groove appears at the left-hand end. Comparing FIGS. 2 and 3, it will be seen that the axial increments can be doubled and instead of being one-half inch apart are one-quarter inch apart. In other words, the sleeve structure 40 as positioned in FIG. 2 provides one series of axial increments and the structure when positioned in FIG. 3 provides a second set or series of increments.

The functioning of the assembly relative to direct engagement with the cylinder end 16 to accomplish a positive stop is the same when the flange 52 is utilized to actuate the control rod 36, because again the significant thing is the axial relationship of the structure 42 (in this case the determining element being the flange 52) and the creation of a situation which will discontinue retraction of the piston rod 14. When the flange 52 is pre-positioned, it will engage the stop 38 and therefore will cause the valve 34 to close against the seat 26 in time to stop the piston by trapping fluid in the left-hand end thereof.

In a situation combining both the valve control and the positive stop, the valve control is relied upon to restrict the flow of fluid out of the cylinder just prior to engagement of the left-hand end of the structure 42 with the cylinder end 16. This has the advantage of eliminating some of the shocks incident to a direct engagement without more.

The features and advantages of the invention have been outlined above. Other aspects will readily occur to those versed in the art, as will many modifications and alterations in the preferred embodiment disclosed, all of which may be achieved without departure from the spirit and scope of the invention.

What is claimed is:

A selective stop assembly for mounting on a rod or the like, comprising; inner and outer concentric, relatively axially adjustable sleeve structures, said inner structure including complementary radially separable rod-embracing parts of generally arcuate cross-section and said outer structure including complementary radially separable parts of generally arcuate cross-section embracing said inner structure; means interengageable between the exterior of the inner structure and the interior of the outer structure for setting said outer structure in selected axial positions relative to the rod-embracing inner structure comprising a plurality of uniformly axially spaced apart abutments on one structure and a complementary interfitting abutment on the other structure to provide a first series of axial adjustments of uniform increment, said uniformly axially spaced abutments being arranged in a set that is axially offset in different amounts from the opposite ends of said one structure by having the first abutment of said set located on one end of said one structure and the last abutment of said set spaced from the other end of said one structure so that said one structure may be turned end-for-end relative to the other structure to thereby provide a second series of axial adjustments; and releasable securing means cooperative between the outer structure parts for securing said parts together in embracing relationship to the rod-embracing inner structure.

References Cited by the Examiner

UNITED STATES PATENTS

| | | | |
|---|---|---|---|
| 1,854,140 | 4/1932 | Hopkins. | |
| 2,143,005 | 1/1939 | Green | 287—52 X |
| 2,858,803 | 11/1958 | Ethington et al. | 91—406 |
| 3,177,976 | 4/1965 | Wenzel | 92—13 X |

CARL W. TOMLIN, *Primary Examiner.*

A. V. KUNDRAT, *Assistant Examiner.*